(12) United States Patent
Miyamoto

(10) Patent No.: US 9,240,734 B2
(45) Date of Patent: Jan. 19, 2016

(54) AC ADAPTER AND ELECTRONIC APPARATUS UNIT

(75) Inventor: Toshihiro Miyamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 755 days.

(21) Appl. No.: 13/437,473

(22) Filed: Apr. 2, 2012

(65) Prior Publication Data

US 2012/0256597 A1 Oct. 11, 2012

(30) Foreign Application Priority Data

Apr. 8, 2011 (JP) ................................. 2011-086747

(51) Int. Cl.
| | |
|---|---|
| H02J 7/02 | (2006.01) |
| H02M 7/06 | (2006.01) |
| H02J 7/00 | (2006.01) |
| H02J 7/04 | (2006.01) |
| H02M 1/36 | (2007.01) |

(52) U.S. Cl.
CPC ............... *H02M 7/06* (2013.01); *H02J 7/0021* (2013.01); *H02J 7/0047* (2013.01); *H02J 7/0068* (2013.01); *H02J 7/02* (2013.01); *H02J 7/027* (2013.01); *H02J 7/042* (2013.01); *H02J 7/045* (2013.01); *H02M 1/36* (2013.01)

(58) Field of Classification Search
CPC ...................................................... H02J 7/0042
USPC .......................................................... 320/111
See application file for complete search history.

(56) References Cited

U.S. PATENT DOCUMENTS

| | | | |
|---|---|---|---|
| 5,420,496 A | 5/1995 | Ishikawa | |
| 5,847,543 A | 12/1998 | Carroll | |
| 7,071,655 B2 | 7/2006 | Murakami et al. | |
| 7,377,805 B2* | 5/2008 | Kim et al. | 439/502 |
| 7,511,458 B2* | 3/2009 | Mori et al. | 320/128 |
| 7,581,130 B2* | 8/2009 | Carroll et al. | 713/340 |
| 2005/0007069 A1 | 1/2005 | Murakami et al. | |
| 2005/0116687 A1 | 6/2005 | Yokomizo et al. | |
| 2005/0189925 A1* | 9/2005 | Nagai et al. | 320/148 |
| 2008/0258674 A1* | 10/2008 | Hui et al. | 320/101 |

FOREIGN PATENT DOCUMENTS

| | | |
|---|---|---|
| CN | 1578052 A | 2/2005 |
| CN | 1790861 A | 6/2006 |
| JP | 5-184065 | 7/1993 |
| JP | 7-143749 | 6/1995 |

(Continued)

OTHER PUBLICATIONS

Chinese Office Action of Chinese Patent Application 201210050419.9 dated Mar. 12, 2014, with English Translation, 22 pages.

(Continued)

*Primary Examiner* — Yalkew Fantu
(74) *Attorney, Agent, or Firm* — Fujitsu Patent Center

(57) ABSTRACT

An AC adapter includes a conversion part, an output terminal, and a voltage adjusting circuit. The conversion part converts alternating current input to an input terminal into a direct current. The output terminal supplies the direct current to an electronic apparatus outside. The voltage adjusting circuit lowers a voltage of the output terminal by a predetermined voltage from a regular supply voltage in a term after the AC adapter is connected to the electronic apparatus until a predetermined time lapses.

8 Claims, 14 Drawing Sheets

(56) References Cited

FOREIGN PATENT DOCUMENTS

| | | |
|---|---|---|
| JP | 2000-134816 | 5/2000 |
| JP | 2003-289661 | 10/2003 |
| JP | 2004-104852 | 4/2004 |
| JP | 2004-304875 | 10/2004 |
| JP | 2004-341592 | 12/2004 |
| JP | 2005-045994 | 2/2005 |
| JP | 2005-295798 | 10/2005 |

OTHER PUBLICATIONS

JPOA—Office Action mailed on Dec. 24, 2014 issued with respect to the basic Japanese Patent Application No. 2011-086747, with partial English translation.

EESR—Extended European Search Report mailed on Jan. 23, 2015 issued with respect to the corresponding European Patent Application No. 12162004.1.

* cited by examiner

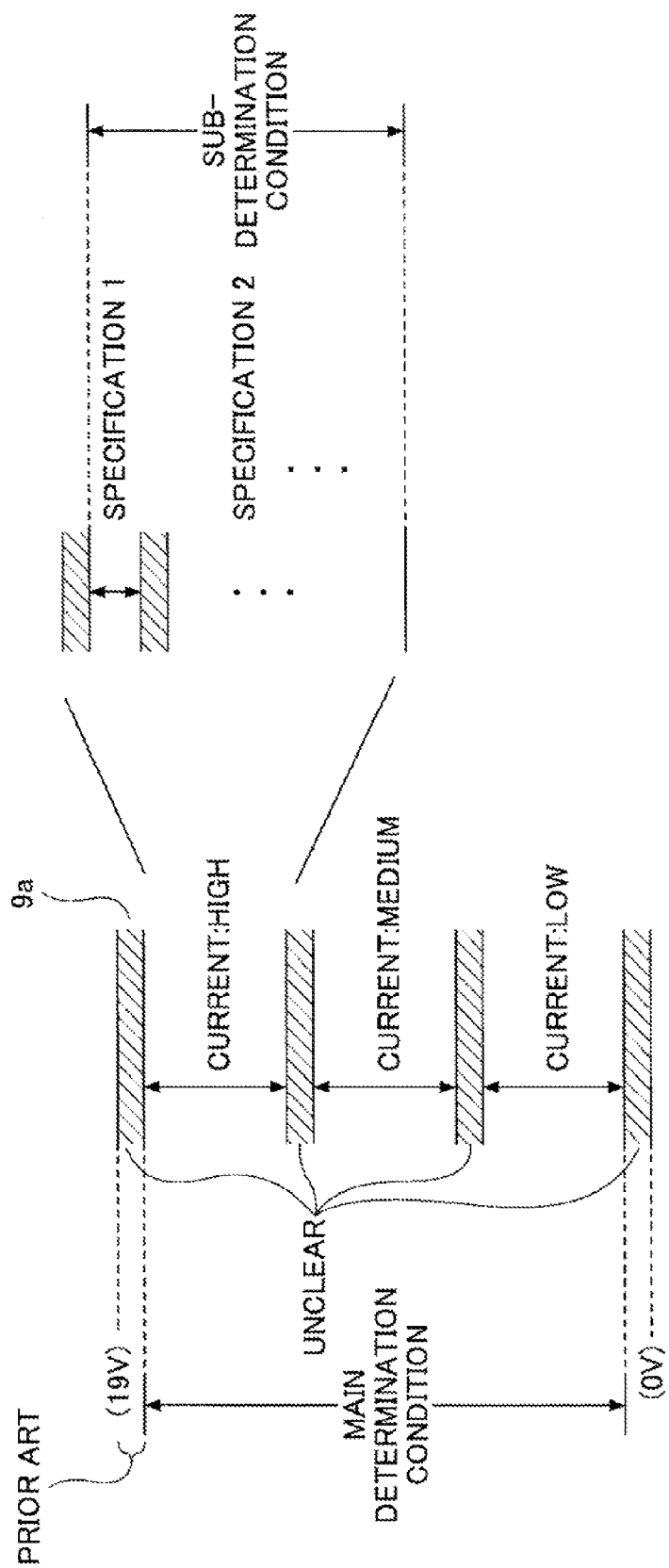

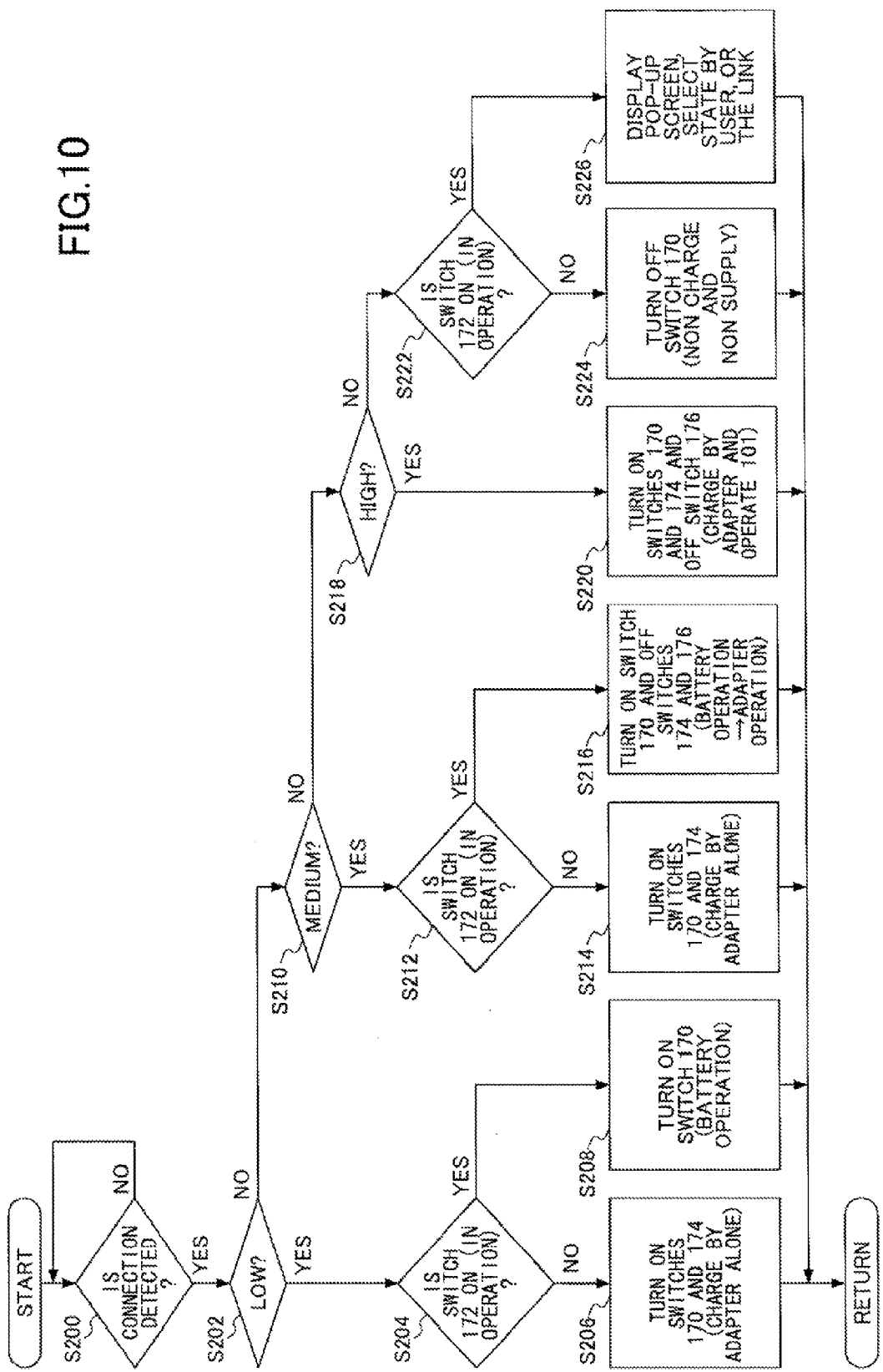

AC ADAPTER AND ELECTRONIC APPARATUS UNIT

CROSS-REFERENCE TO RELATED APPLICATIONS

This patent application is based upon and claims the benefit of priority of the prior Japanese Patent Application No. 2011-086747 filed on Apr. 8, 2011, the entire contents of which are incorporated herein by reference.

FIELD

The embodiments discussed herein are related to an AC adapter for converting an alternating current into a direct current and supplying the direct current to an electronic apparatus, and an electronic apparatus unit including the AC adapter and the electronic apparatus.

BACKGROUND

Conventionally, an alternator such as a commercial power or the like supplied through a household outlet has been widely used. On the other hand, an electronic apparatus such as a computer or the like generally operates with the direct current. Accordingly, an AC adapter is used to convert an alternating current into a direct current and supply the direct current to an electronic apparatus (hereinafter, called "main device").

The AC adapter has a different rated current, a different type, and the like depending on its size or the like. By these different features, power to be supplied becomes different. However, since it is not possible to determine the rated current, the different type, and the like of the AC adapter at a side of the main device, a relationship between the main device and the AC adapter has been fixed. Accordingly, there is no compatibility between models, or manufacturers, and the AC adapter has not been standardized between different models, or manufacturers.

Also, in a state of supplying power from the AC adapter to the main device, in an order of a state of a smaller power consumption, the state of the power supply may be one of the following states: (1) a state of conducting power supply only to charge an internal battery of the main device, (2) a state of conducting power supply only for an actual operation of the main device. Moreover, as a state in which the power consumption is great, the power supply may be in (3) a state of conducting power supplies for a charge of the internal battery and for an actual operation of the main device. However, there is no guarantee that the AC adapter supports all states by its possible power to supply.

Technologies related to the above described problems have been known as follows.

Japanese Laid-open Patent Application No. 2004-341592 discloses a system including the main device capable of detecting power supply capacity information of an external power source device. In this system, a terminal other than a regular terminal for supplying power is provided. By detecting, in the main device, a range in which a voltage supplied from a side of the main device is dropped due to a resistor provided at a side of an external power source, a power supply ability of the external device is detected.

Also, Japanese Laid-open Patent Application No. H07-143749 discloses an AC adapter which includes an oscillation part for generating a signal voltage of an oscillation frequency corresponding to a current value possible to supply, and the signal voltage is superimposed with an original DC voltage. In the main device disclosed in Japanese Laid-open Patent Application No. H07-143749, an operation state of the main device is changed by separating the signal voltage from the original voltage and measuring the signal voltage.

Moreover, Japanese Laid-open Patent Application No. H05-184065 discloses that connections of various types of power sources such as an AC adapter, an external battery, and the like are assumed, and the main device determines which type of the power source is connected based on the power voltage. In the main device, based on the determined type of the power source, the power consumption is adjusted in one of the above states (1) to (3).

Furthermore, Japanese Laid-open Patent Application No. 2000-134816 discloses a system in which when the AC adapter is connected, an impedance on a power source output line is changed in a certain time, and a power source input specification of the main device itself is informed to the AC adapter. The AC adapter, which is disclosed in Japanese Laid-open Patent Application No. 2000-134816, generates the power source for an operation based on the informed power source input specification.

However, in a system disclosed in Japanese Laid-open Patent Application No. 2004-341592, since the number of output terminals of the AC adapter is increased, there is a problem in which the expense and the size of the AC adapter are increased.

Also, in the AC adapter disclosed in Japanese Laid-open Patent Application No. H07-143749, since the oscillation part for generating the signal voltage is additionally included, there is a problem in which the expense and the size of the AC adapter are increased.

Moreover, in the AC adapter disclosed in Japanese Laid-open Patent Application No. H05-184065, it is difficult to determine the same power source as an output voltage. Accordingly, there is a problem in which a different type of the AC adapter may not be determined.

Furthermore, in the system disclosed in Japanese Laid-open Patent Application No. 2000-134816, since the AC adapter generates the power source for the operation of the AC adapter based on the specification of the main device, as a result, the AC adapter depends on the specification of the main device. Accordingly, it is not possible for the AC adapter including the above described mechanism to connect to the main device, and the main device does not allow AC adapters which are based on various specifications.

SUMMARY

According to one aspect of the embodiment, there is provided an AC adapter including a conversion part configured to convert alternating current input to an input terminal into a direct current; an output terminal configured to supply the direct current to an electronic apparatus outside; and a voltage adjusting circuit configured to lower a voltage of the output terminal by a predetermined voltage from a regular supply voltage in a term after the AC adapter is connected to the electronic apparatus until a predetermined time lapses.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 9 is a diagram for illustrating a relationship between a predetermined voltage Vh and a suppliable current of the AC adapter;

FIG. 10 is a flowchart for explaining a process performed by an EC/KBC;

DESCRIPTION OF EMBODIMENTS

In the following, embodiments of the present invention will be described with reference to the accompanying drawings.

First Embodiment

An AC adapter 1 and an electronic apparatus 101 using an AC adapter will be described according to a first embodiment.

Figure 1:
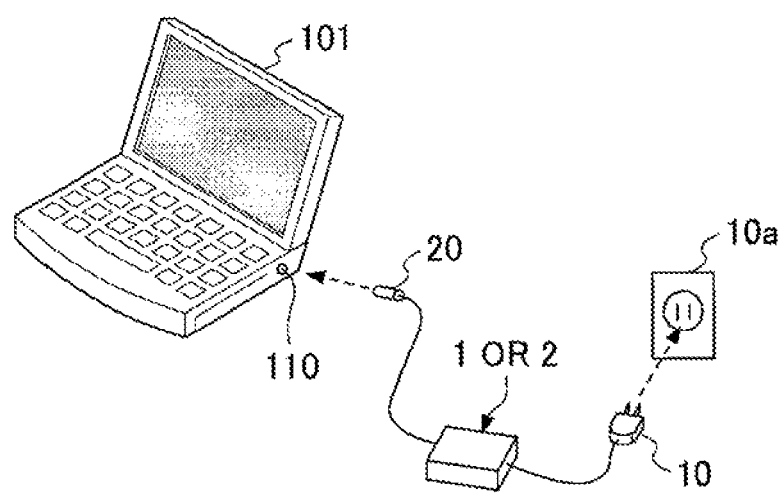
FIG. 1 is an outline diagram illustrating a state in which an AC adapter according to a first embodiment.

FIG. 1 is an outline diagram illustrating a state in which the AC adapter 1 according to the first embodiment is connected to the electronic apparatus 101. As illustrated in FIG. 1, in the AC adapter 1 (or an AC adapter 2 described later in a second embodiment), one contact 10 as a plug-in is connected to an AC outlet 10a for household use, and another contact 20 as a terminal is connected to an input terminal 110 of the electronic apparatus 101. The electronic apparatus 101 may be regarded as a laptop personal computer, and functions as the main device using the AC adapter 1 or 2. Other examples of the electronic apparatus 101, a desktop personal computer, an Audio Visual (AV) device such as a television and a game machine, a portable television, and the like may be used.

[AC Adapter]

Figure 2:
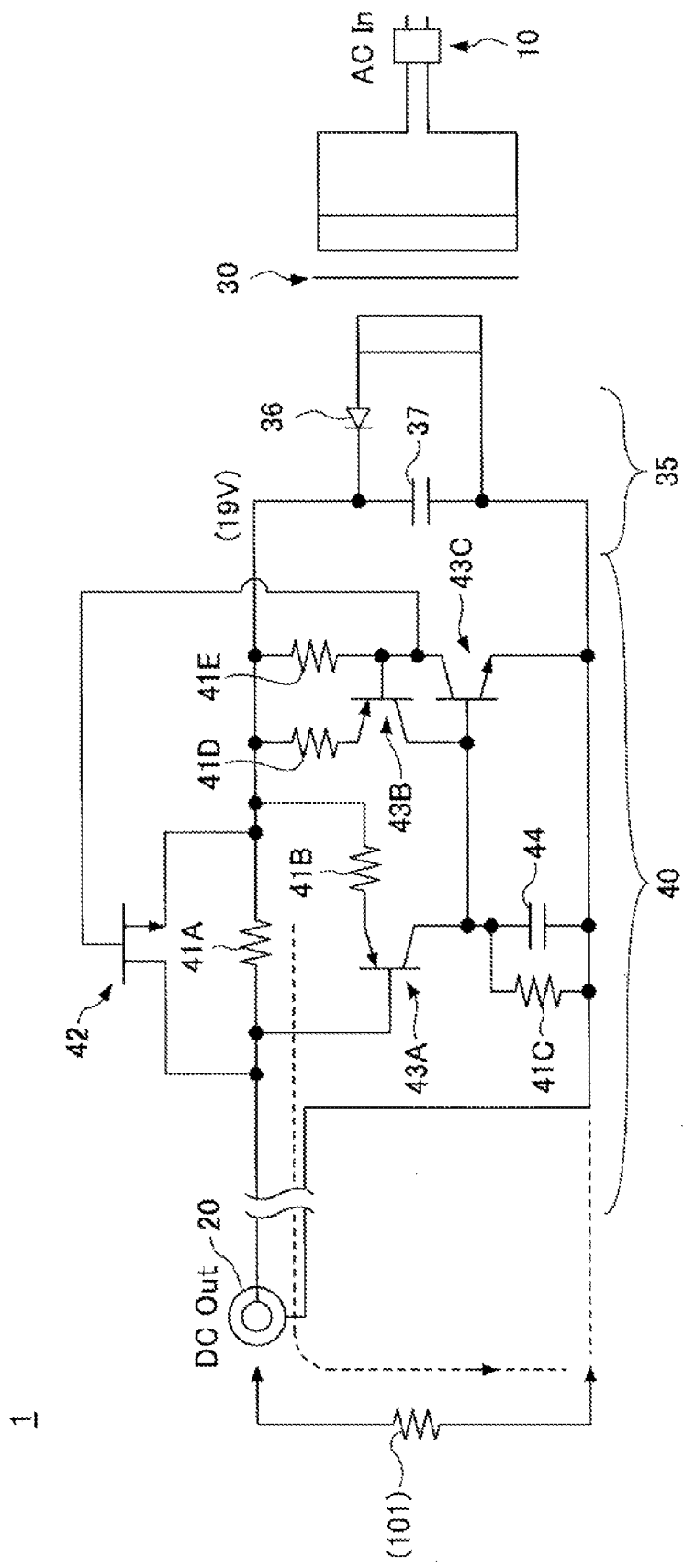
FIG. 2 is a diagram illustrating a circuit configuration of the AC adapter according to the first embodiment.

FIG. 2 is a diagram illustrating a circuit configuration of the AC adapter 1 according to the first embodiment. As illustrated in FIG. 2, the AC adapter 1 includes the contact 10 being an input terminal as the plug, the contact 20 being an output terminal, a transformer 30, a rectification-smoothing circuit 35, and a voltage adjusting circuit 40.

The transformer 30 may lower an alternating current input to the contact 10 to AC $19/(\sqrt{2})$ [V]. The alternating current input to the contact 10 may be regarded as power of AC 100 [V] for a commercial use.

The rectification-smoothing circuit 35 includes a diode 36, a capacitor 37, and the like. The rectification-smoothing circuit 35 converts the alternating current output from the transformer 30 into the direct current, and outputs the direct current to a side of the voltage adjusting circuit 40. A configuration of the rectification-smoothing circuit 35 illustrated in FIG. 2 is an example. Another configuration including a bridge circuit or the like may be applied.

The voltage adjusting circuit 40 may be formed by a time-limit operation circuit, and includes a resistors 41A, 41B, 41C, 41D, and 41E, a P-channel Field Effect Transistor (FET) 42, a transistors 43A, 43B, and 43C, and a capacitor 44. The voltage adjusting circuit 40 lowers a voltage of the connector 20 in a predetermined time T1 after the AC adapter 1 is connected to the electronic apparatus 101, from a regular supply voltage Vn (which may be 19 [V]) to a predetermined voltage Vh.

The resistor 41A is regarded as an output impedance element for determining the predetermined voltage Vh. The predetermined voltage Vh represents an information value for sending information of the specification of the AC adapter 1 to a side of the electronic apparatus 101. The information of the specification may indicate suppliable current, and may include information of an output voltage, a product number, a manufacturer, and the like. Details will be described later.

The P-channel FET 42 changes from an OFF state to an ON state when the predetermined time T1 passes after the AC adapter 1 is connected to the electronic apparatus 101. By this configuration, the current flows to the contact 20 through the P-channel FET 42, a voltage in the contact 20 rises to the regular supply voltage Vn.

Figure 3:
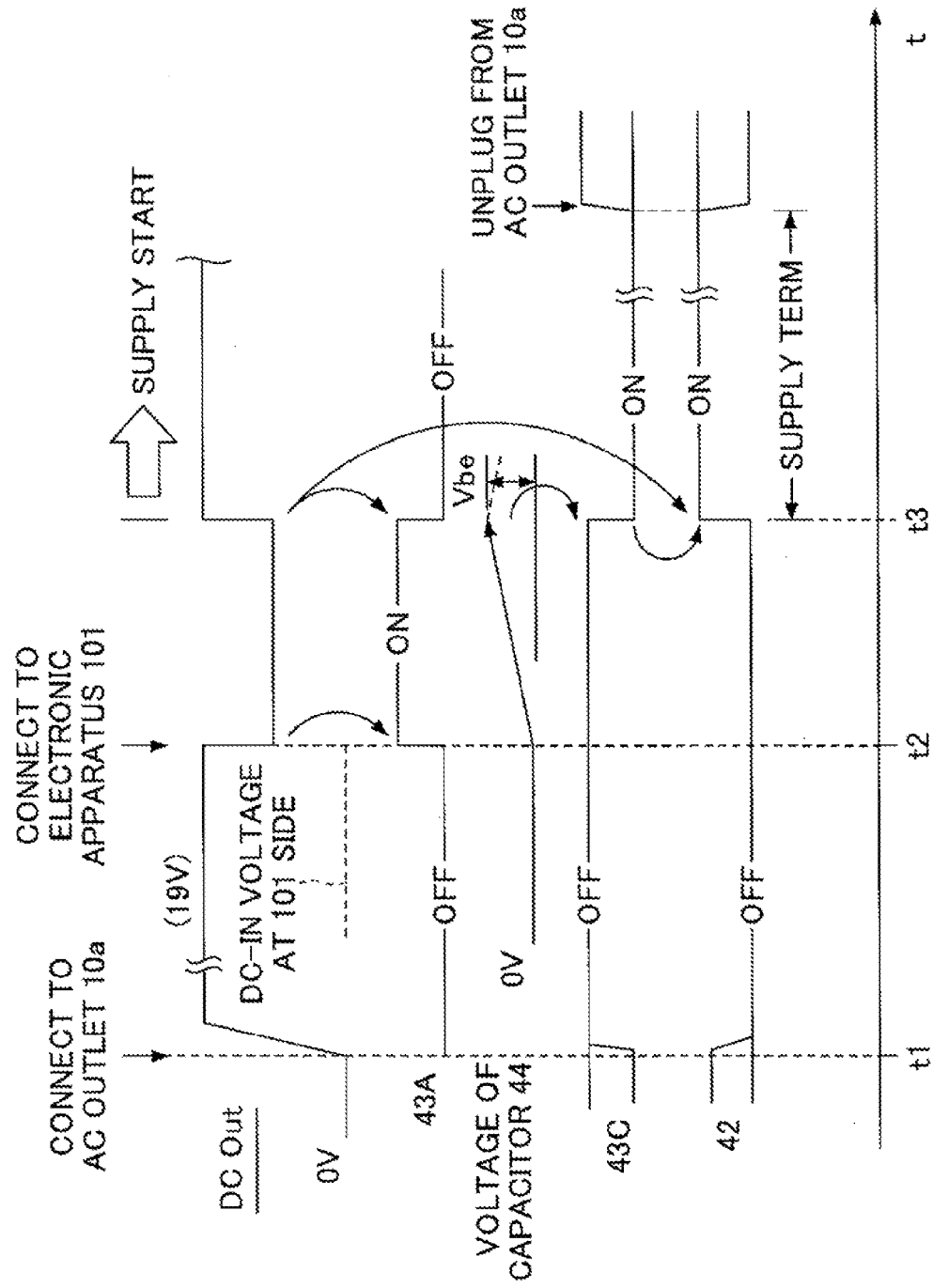
FIG. 3 is a diagram illustrating a state change of each of components of the AC adapter in a term after the AC adapter is connected to an AC outlet and is mounted to an electronic apparatus and until power supply starts to the electronic apparatus.

Other configuration parts of the voltage adjusting circuit 40 are used for the resistor 41A and the P-channel FET 42 described above to operate. In the following, a state change of each of components of the AC adapter 1 will be described. FIG. 3 is a diagram illustrating the state change of each of the components of the AC adapter 1 in a term after the AC adapter 1 is connected to the AC outlet 10a and is mounted to the electronic apparatus 101 and until power supply starts to the electronic apparatus 101.

As illustrated in FIG. 3, when the AC adapter 1 is connected to the AC outlet 10a (time t1), the voltage in the contact 20 rises to the regular supply voltage Vn. After that, when the contact 20 is connected to the electronic apparatus 101 (time t2), the current flows from the AC adapter 1 to the electronic apparatus 101, and a state of the transistor 43A changes from the OFF state to the ON state in response to a voltage drop. When the transistor 43A is in the ON state, the current, which is determined based on resistance values of the resistors 41A and 41B, flows into the capacitor 44, and the capacitor 44 is charged.

Accordingly, the predetermined time T1 passes from the time t2. When a charging voltage of the capacitor 44 becomes higher than a certain voltage Vbe (time t3), the transistor 43C changes from the OFF state to the ON state, and lowers a gate voltage of the P-channel FET 42 to 0 [V]. As a result, the P-channel FET 42 changes from the OFF state to the ON state, and the voltage of the contact 20 rises to the regular supply voltage Vn.

When the state of transistor 43C becomes the ON state, the state of the transistor 43B becomes the ON state, and a base current of the transistor 43C is supplied. Accordingly, the transistor 43C is retained in the ON state.

As described above, when the contact 20 is connected to the electronic apparatus 101, the capacitor 44 is charged. When the charging voltage becomes a certain voltage Vbe after a certain time lapses, the transistor 43C is retained in the ON state. As a result, the voltage of the contact 20 rises to the regular supply voltage Vn, and the power supply starts to the electronic apparatus 101.

According to the above described configurations, by appropriately selecting the resistance value of the resistor 41A, it is possible to realize the predetermined voltage Vh. By selecting the predetermined voltage Vh based on the specification of the AC adapter 1, it is possible to send the information of the specification of the AC adapter 1 to the electronic apparatus 101. Also, the number of terminals is not increased to send the information of the specification. It is possible to suppress increasing the expense and the size of the AC adapter 1.

[Electronic Apparatus (Main Device)]
{Configuration}

Figure 4:
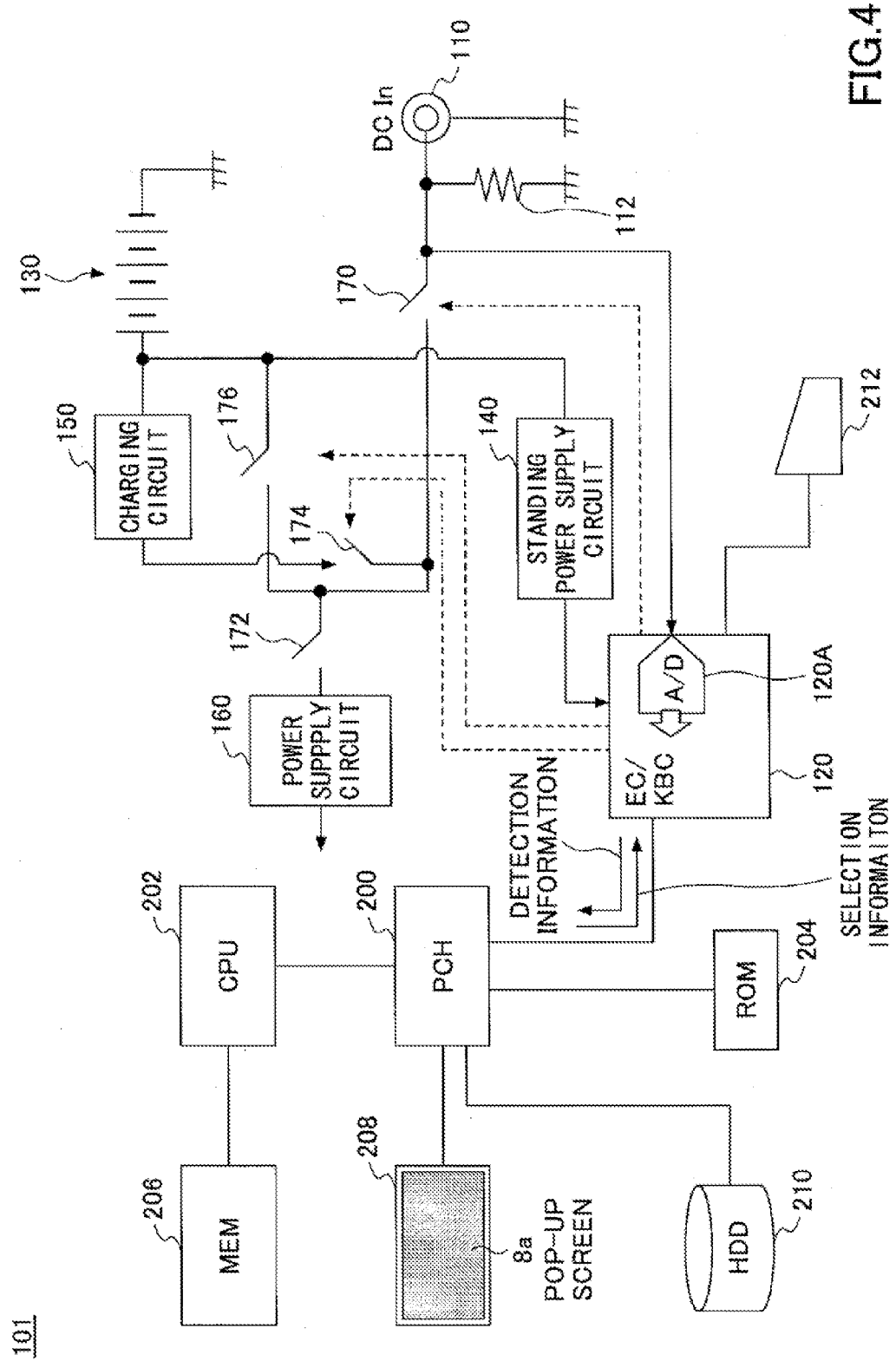
FIG. 4 is a diagram illustrating an example of a circuit configuration of the electronic apparatus.

FIG. 4 is a diagram illustrating an example of a circuit configuration of the electronic apparatus 101. As illustrated in FIG. 4, the electronic apparatus 101 includes the input terminal 110, a pull-down resistor 112, an EC (Enabled Controller)/KBC (Keyboard Controller) 120, a battery 130, a standing power supply circuit 140, a charging circuit 150, and a power supply circuit 160. Switches 170, 172, 174, and 176 are provided among components.

The EC/KBC 120 internally mounts a Central Processing Unit (CPU) and an A/D convertor 120A, and controls a pointing device such as a keyboard (KB), a mouse, and the like. Also, the EC/KBC 120 conducts various processes using its processing ability, and is operated by the power supply from the standing power supply circuit 140 which is an independent power supply circuit.

Figure 5:
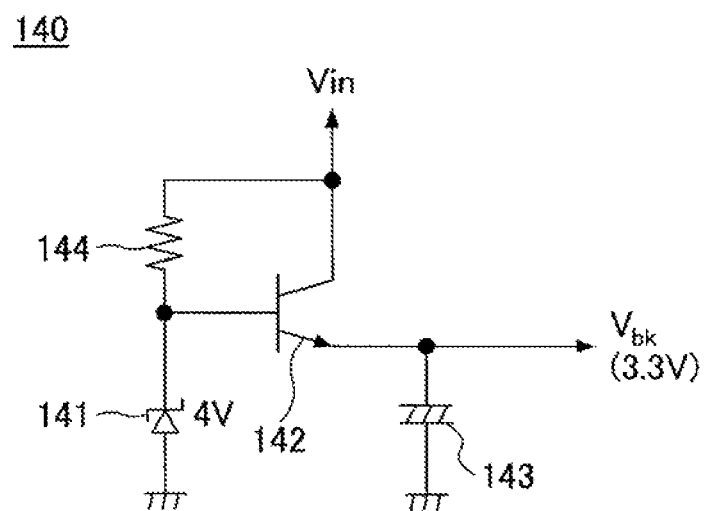
FIG. 5 is a diagram illustrating a circuit configuration example of a standing power supply circuit.

FIG. 5 is a diagram illustrating a circuit configuration example of the standing power supply circuit 140. The standing power supply circuit 140 operates as a power supply circuit which outputs a lower current always being supplied. The standing power supply circuit 140 may be a dropper type circuit in which an input voltage Vin is input from the battery 130 and a 3.3 [V] voltage is output. The standing power supply circuit 140 includes a transistor 142 retaining the base voltage at 4 [V] by a Zener diode 141, a capacitor 143, a voltage drop resistor 144, and the like.

Figure 6:
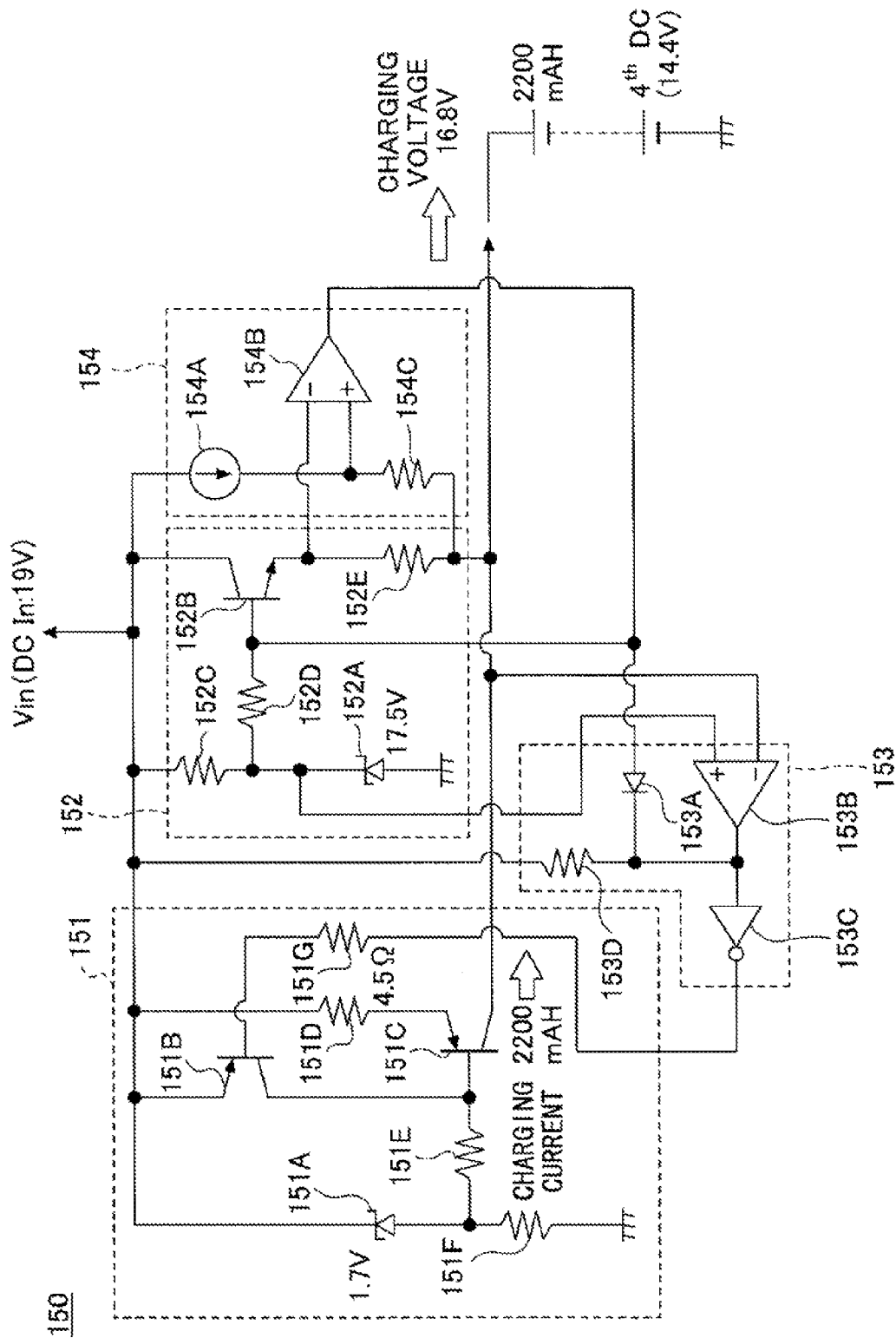
FIG. 6 is a diagram illustrating a circuit configuration example of a charging circuit.

FIG. 6 is a diagram illustrating a circuit configuration example of the charging circuit 150. The charging circuit 150 may utilize a circuit of CC (Constant Current)/CV (Constant Voltage) method, and may include a constant current charging circuit 151, a constant voltage charging circuit 152, a charging voltage detection circuit 153, and an ending current detection circuit 154.

The constant current charging circuit 151 includes a Zener diode 151A, transistors 151B and 151C, and resistors 151D, 151E, 151F, and 151G. On a cathode side of the Zener diode 151A, the transistor 151B, and the resister 151D are connected in parallel to the Zener diode 151A. A base of the transistor 151B is connected to an output terminal of the charging voltage detection circuit 153 through the resistor 151G. An emitter of the transistor 151B is connected to the input voltage Vin, and a collector of the transistor 151B is connected to an anode side of the Zener diode 151A through the resistor 151E. Also, a base of the transistor 151C is connected to a collector of the transistor 151B. An emitter of the transistor 151C is connected to the input voltage Vin through the resistor 151D, and the collector of the transistor 151C is connected to the output terminal of the charging voltage.

The constant voltage charging circuit 152 includes a Zener diode 152A, a transistor 152B, and resistors 152C, 152D, and 152E. A cathode side of the Zener diode 152A is connected to the input voltage Vin through the resistor 152C, and is also connected to a base of the transistor 152B through the resistor 152D. A collector of the transistor 152B is connected to the input voltage Vin. An emitter of the transistor 152B is connected to a negative terminal of an operational amplifier 154B of the ending current detection circuit 154, and is also connected to an output terminal of the charging voltage through the resistor 152E.

The charging voltage detection circuit 153 includes a diode 153A, an operational amplifier 153B, an inverter 153C, and a resistor 153D. An anode side of the diode 153A is connected to an output terminal of the ending current detection circuit 154. A cathode side of the diode 153A is connected to the input voltage Vin through the resistor 153D, and is also connected to an output terminal of the operational amplifier 153B and an input side of the inverter 153C. A positive terminal of the operational amplifier 153B is connected to the input voltage Vin through the resistor 152C, and the charging voltage is negatively fed back to a negative terminal of the operational amplifier 153B.

The ending current detection circuit 154 includes a constant current generator 154A, an operational amplifier 154B, and a resistor 154C. The input voltage Vin is input to the constant current generator 154A. An output terminal of the constant current generator 154A is connected to a positive terminal of the operational amplifier 154B, and is also connected to an output terminal of the charging voltage through the resistor 154C.

The charging circuit 150 conducts charging with the same charging voltage as a rated output current at a first stage. When the voltage of the battery achieves a rated voltage, a charge with a constant voltage is performed at a second stage. Accordingly, when a charging current becomes equal to or lower than a certain voltage, the charging circuit 150 ends charging the battery 130. In the charging circuit 150 in the first embodiment, it is assumed that the battery 130 as a charging target is a lithium ion secondary battery of fourth DC 14.4 [V] and 2200 [mAH].

Figure 7:
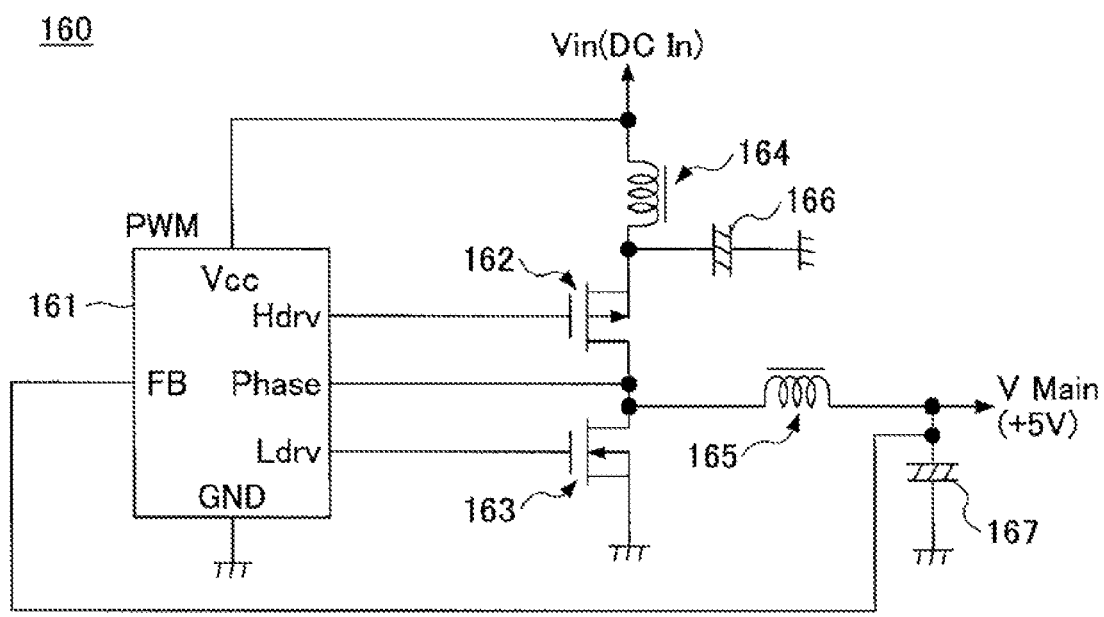
FIG. 7 is a diagram illustrating a circuit configuration example of a power supply circuit.

FIG. 7 is a diagram illustrating a circuit configuration example of the power supply circuit 160. The power supply circuit 160 may include a Pulse Width Modulation (PWM) circuit 161, a Metal Oxide Semiconductor (P-MOS) 162, an N-MOS 163, a coils 164 and 165, and capacitors 166 and 167. The power supply circuit 160 may be a power supply circuit of a PWM method and a synchronous rectifying type. The power supply circuit 160 supplies basic power inside itself.

Also, the electronic apparatus 101 includes a Platform Controller Hub (PCH) 200, a Central Processing Unit (CPU) 202, a Read-Only Memory (ROM) 204, and memory (MEM) 206. Moreover, the electronic apparatus 101 includes a display 208, a Hard Disk Drive (HDD) 210, a keyboard/mouse 212, and the like.

The PCH 200 is generally called a chipset, and functions as an interface to a peripheral device. The CPU 202 is regarded as a processor including a calculation process function and a memory control function. The ROM 204 may be a non-volatile memory used to load an Operating System (OS) from a Hard Disk Drive 210, and to store a Basic Input Output System (BIOS) being a program to start up a system. The MEM 206 is connected to an EEPROM (Electrically Erasable and Programmable Read Only Memory) and the CPU 202, and stores the OS, an application program, and data. The display 208 displays a human/machine interface. The HDD 210 stores the OS, the application programs, and the data as an auxiliary storage device.

{Specification Determination of AC Adapter}

Figure 8:
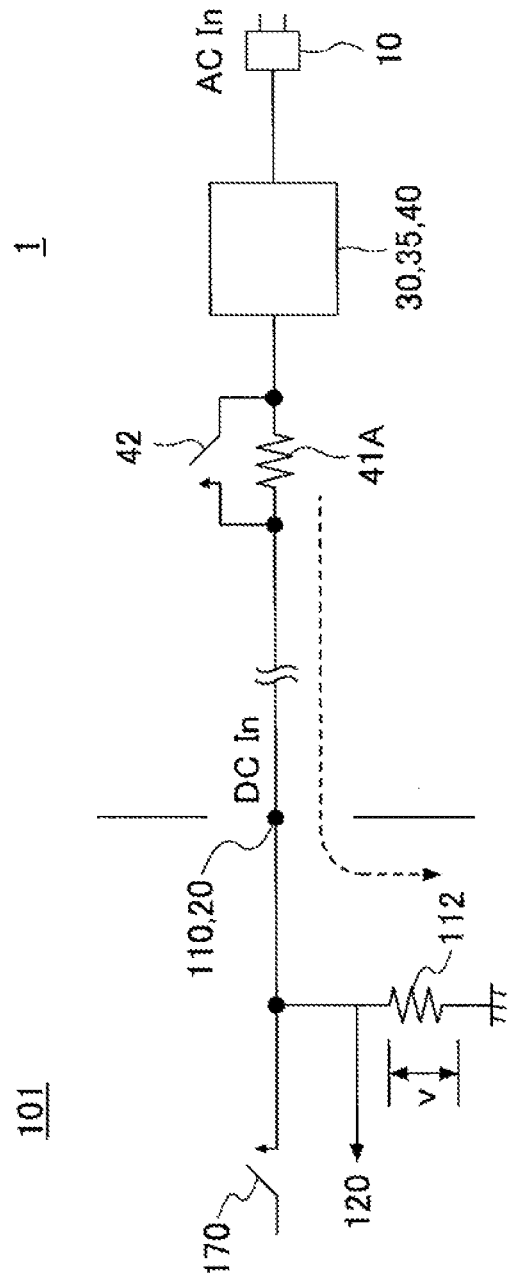
FIG. 8 is a diagram illustrating a mechanism for the electronic apparatus to determine a specification of the AC adapter.

In the following, a specification determination of the AC adapter 1 performed by the electronic apparatus 101 in the first embodiment will be described. FIG. 8 is a diagram illustrating a mechanism for the electronic apparatus 101 to determine the specification of the AC adapter 1 in the first embodiment. When the AC adapter 1 is connected to the electronic apparatus 101, the contact 20 is connected to the input terminal 110. Then, an output impedance 41A of the AC adapter 1, and a voltage across the pull-down resistor 112, which is divided by the pull-down resistor 112 at a side of the electronic apparatus 101, are input into the A/D convertor 120A of the EC/KBC 120. It should be noted that if the contact 20 is not connected to the input terminal 110, a detected voltage of the input terminal 110 becomes a ground level (0 [V]).

The EC/KBC 120 monitors a voltage generated from the pull-down resistor 112 by current flowing in the pull-down resistor 112 in a predetermined time after the AC adapter 1 is connected, and determines the specification of the AC adapter 1 by the generated voltage.

As described above, the AC adapter 1 lowers a voltage in the contact 20 by a predetermined voltage Vh from the regular supply voltage Vn in the predetermined time after the AC adapter 1 is connected. If the current of the AC adapter 1 possible to supply is classified into three stages: a high stage, a medium stage, and a low stage, by the specification, the predetermined voltage Vh may be determined as follows:

suppliable current–high:

in a range of $Vh=Vn\times(9/12)$ to $Vn\times(11/12)$ suppliable current–medium:

in a range of $Vh=Vn\times(4/12)$ to $Vn\times(7/12)$ suppliable current—low:

in a range of $Vh=Vn\times(1/12)$ to $Vn\times(3/12)$

FIG. 9 is a diagram for illustrating a relationship between the predetermined voltage Vh and the suppliable current of the AC adapter 1. As illustrated in FIG. 9, a range of $Vh=Vn\times(11/12)$ to Vn, a range of $Vh=Vn\times(7/12)$ to $Vn\times(8/12)$, and a range of $Vh=0$ to $Vn\times(1/12)$ are unclear zones in the specification of the AC adapter 1 (represented by guard bands 9a in FIG. 8). By using the above described ranges, it is possible to suppress an improper operation of the electronic apparatus 101 due to a measurement error. The entire range may be used as a main determination condition, and a sub-determination condition may be set in each of the above described ranges.

As described above, the specification of the AC adapter 1, which is determined by the EC/KBC 120, may not be limited to the suppliable current. The specification may indicate the output voltage, a product number, a manufacturer, or the like.

Accordingly, it is possible for the AC adapter 1 to detect the electronic apparatus 101. As a result, a proper control described below is performed.

{State Control}

In the following, an operation control of the electronic apparatus 101, which depends on the specification of the AC adapter 1 and is determined by the EC/KBC 120, will be described. Based on the specification of the AC adapter 1, the electronic apparatus 101 determines one of operational states of: (1) only charging the battery 130, (2) only conducting an actual operation, and (3) charging the battery 130 and conducting the actual operation. A state of conducting the "actual operation" may be a state of a regular operation other than charging the battery 130 is conducted.

FIG. 10 is a flowchart for explaining a process performed by the EC/KBC 120 in the first embodiment.

First, the EC/KBC 120 waits until a detection voltage of the input terminal 110 rises from 0 [V], that is, a connection of the AC adapter 1 is detected (step S200).

When the connection of the AC adapter 1 is detected, it is determined whether or not the suppliable current of the AC adapter 1 indicates "low", based on the detected voltage of the input terminal 110 (step S202). When the suppliable current of the AC adapter 1 does not indicate "low", it is determined whether the current indicates "medium". Moreover, when the suppliable current of the AC adapter 1 does not indicate "medium", it is determined whether the current indicates "high" (steps S210 and S218).

When the suppliable current of the AC adapter 1 indicates "low", it is determined whether the switch 172 is in the ON state, that is, it is determined whether the electronic apparatus 101 is in an operation (step S204). When the electronic apparatus 101 is not in the operation, the switches 170 and 174 are turned on, and the battery 130 is charged by power supplied from the AC adapter 1 (step S206). On the other hand, when the electronic apparatus 101 is in the operation, the switch 170 is turned off and the power supplied from the AC adapter 1 is shut off, so that the electronic apparatus 101 successively operates by power from the battery 130 (step S208).

When the suppliable current of the AC adapter 1 indicates "medium", it is determined whether the switch 172 is in the ON state, that is, the electronic apparatus 101 is in the operation (step S212). When the electronic apparatus 101 is not in the operation, the switches 170 and 174 are turned on, and the battery 130 is charged by the power supplied from the AC adapter 1 (step S214). On the other hand, when the electronic apparatus 101 is in the operation, the switch 170 is turned on, the switches 174 and 176 are turned off to shut off the power supplied from the battery 130, and the electronic apparatus 101 is switched to the operation by the AC adapter 1 (step S216).

When the suppliable current of the AC adapter 1 indicates "high", regardless of a state of the switch 172, the switches 170 and 174 are turned on and the switch 176 is also turned off (step S220). By this switching operation, it is possible to charge the battery 130 by power supplied from the adapter 1, and it is also for the electronic apparatus 101 to operate.

When the suppliable current of the AC adapter 1 is not any of "low", "medium", and "high" and is unclear, it is determined whether the switch 172 is turned on, that is, the electronic apparatus 101 is in the operation (step S222). When the electronic apparatus 101 is in the operation, the switch 170 is turned off (step S224). In this case, any of charging the battery 130 and supplying power for the operation of the electronic apparatus 101 is not performed. On the other hand, in a case in which the electronic apparatus 101 is in the operation, the EC/KBC 120 displays a popup screen described later, and performs an exception process such as a state selection by a user (step S226).

According to the above described process, it is possible to conduct a proper state control depending on the specification of the AC adapter 1. By this process, it is possible to prevent problems in which the suppliable power of the AC adapter 1 becomes insufficient, the operation of the electronic apparatus 101 stops, and the battery 130 is not sufficiently charged. Accordingly, it is possible for the electronic apparatus 101 to allow for the AC adapter 1 which is minimized with light weight and is used only to charge the power. Then, it is possible to expand a product lineup.

{Screen Display Process}

In the following, a screen display process in a case for the electronic apparatus 101 to detect the connection of the AC adapter 1 will be described. In a case in which the connection of the AC adapter 1 is detected, if the OS of the electronic apparatus 101 is activated, the EC/KBC 120 generates an interruption and sends a determination result of the AC adapter 1 (detection information in FIG. 4). When the OS of the electronic apparatus 101 receives the interruption, the OS displays, at the display 208, a message indicating that the interruption is made (the pop-up screen 8a in FIG. 4).

Figure 11B:
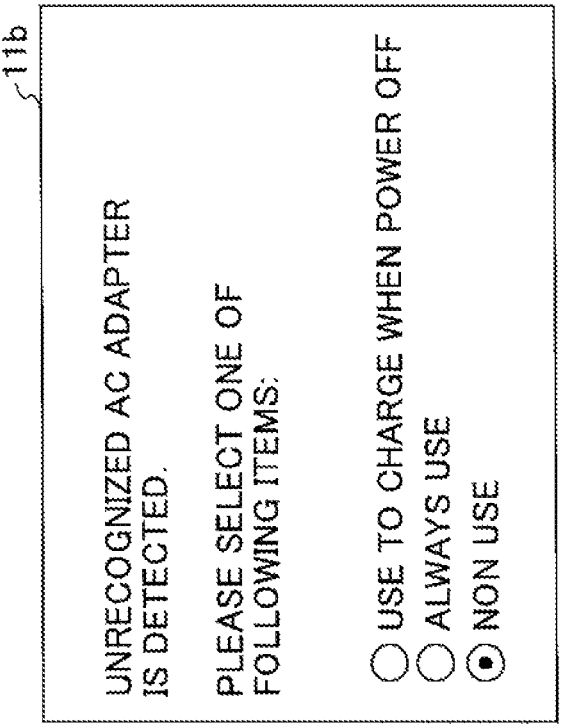
FIG. 11A and FIG. 11B are diagrams illustrating examples of a popup screen displayed when the AC adapter is connected.
Figure 11A:
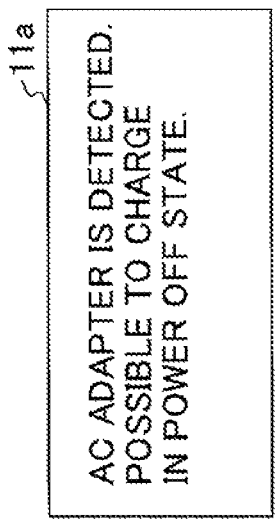

FIG. 11A and FIG. 11B are diagrams illustrating examples of the popup screen displayed when the AC adapter 1 is connected. FIG. 11A illustrates a screen 11a displayed when the AC adapter 1 of "suppliable current—low" is connected to the electronic apparatus 101. FIG. 11B illustrates a screen 11b displayed when the AC adapter 1 of "suppliable current—unclear" is connected to the electronic apparatus 101. By displaying the screen 11b, the user is urged to select a radio button. Information (selection information in FIG. 4) selected by the user is sent to the EC/KBC 120. The EC/KBC 120 receives information from the OS, and operates the switches 170 through 176 based on an instruction from the OS. In this case, if no selection is made by the user in a certain time, the EC/KBC 120 may turn off the switch 170 and shut off the AC adapter 1.

SUMMARY

According to the AC adapter 1 in the first embodiment, by setting the predetermined voltage Vh based on the specification of the AC adapter 1, it is possible to report the specification of the AC adapter 1 to the electronic apparatus 101 being the main device. Also, since the number of the output terminals is not increased to report the specification of the AC adapter 1, it is possible to suppress the increase of the expense and the size of the AC adapter.

According to the electronic apparatus 101 in the first embodiment, a proper state control is performed based on the specification of the AC adapter 1. Therefore, it is possible to prevent problems in which since the suppliable power of the AC adapter 1 becomes insufficient, the operation of the electronic apparatus 101 stops and the battery 130 is not sufficiently charged.

Figure 12:
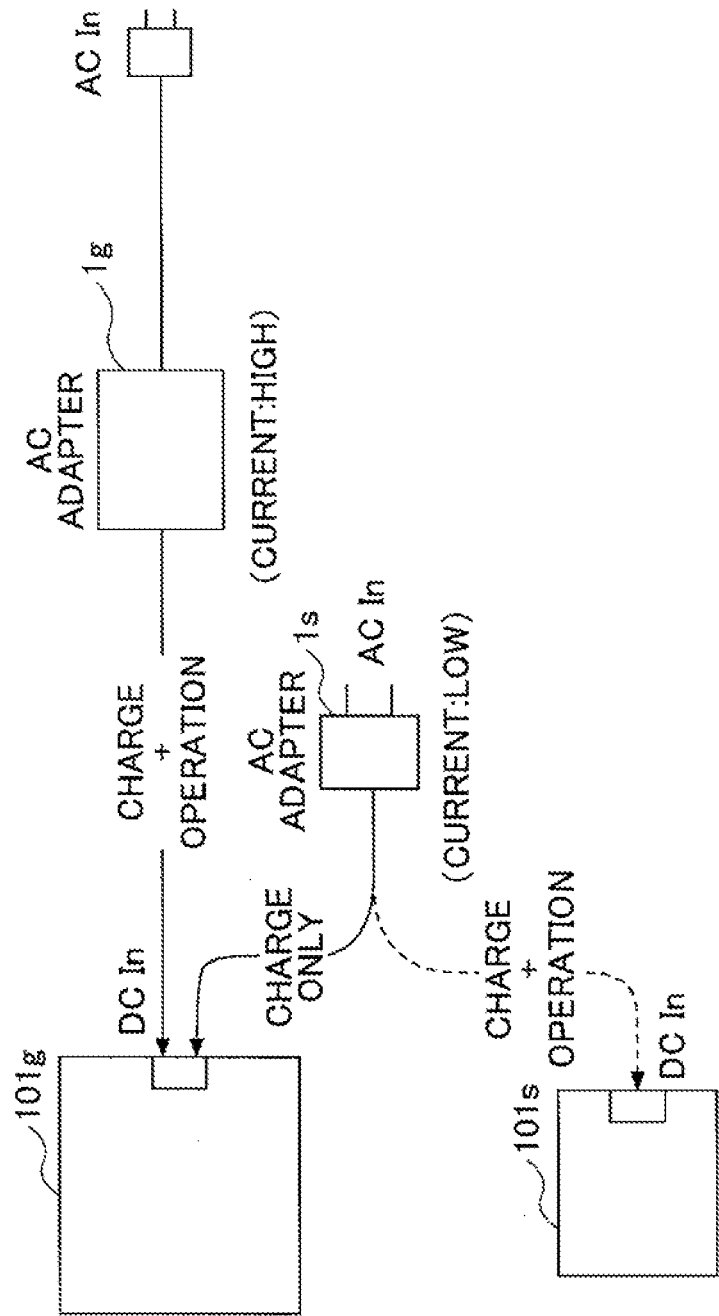
FIG. 12 is a diagram for explaining an effect of the first embodiment.

FIG. 12 is a diagram for explaining an effect of the first embodiment. In FIG. 12, an AC adapter 1g corresponds to an application example of the AC adapter 1 of "suppliable current—high", and the AC adapter is corresponds to an application example of the AC adapter 1 of "suppliable current—low". Also, the electronic apparatus 101g corresponds to an application example of the electronic apparatus 101 having great power consumption, and the electronic apparatus 101s corresponds to the electronic apparatus 101 having a small power consumption. In this configuration, in a case in which the AC adapter 1g is connected to the electronic apparatus 101g, it is possible to charge the battery 130 and supply power for the operation of the electronic apparatus 101g. On the other hand, in a case in which the electronic apparatus 101g is connected to the AC adapter is, it is possible only to charge the battery 130. In a case in which the AC adapter is is connected to the electronic apparatus 101s, it is possible to charge the battery 130 and also supply the power for the operation of the electronic apparatus 101g. Accordingly, if the AC adapter 1 reports the specification of the AC adapter 1 itself to the electronic apparatus 101, it is possible to perform the state control depending on the specification of the AC adapter 1. Thus, it is possible to extend a variety of combinations of the AC adapter 1 and the electronic apparatus 101. That is, it is possible to improve compatibility of the AC adapter 1.

In the first embodiment, the AC adapter 1 and the electronic apparatus 101 correspond to an example of an "electronic apparatus unit" in claims.

Second Embodiment

In the following, an AC adapter 2 and an electronic apparatus 102 using the AC adapter 2 in a second embodiment will be described.

Figure 13:
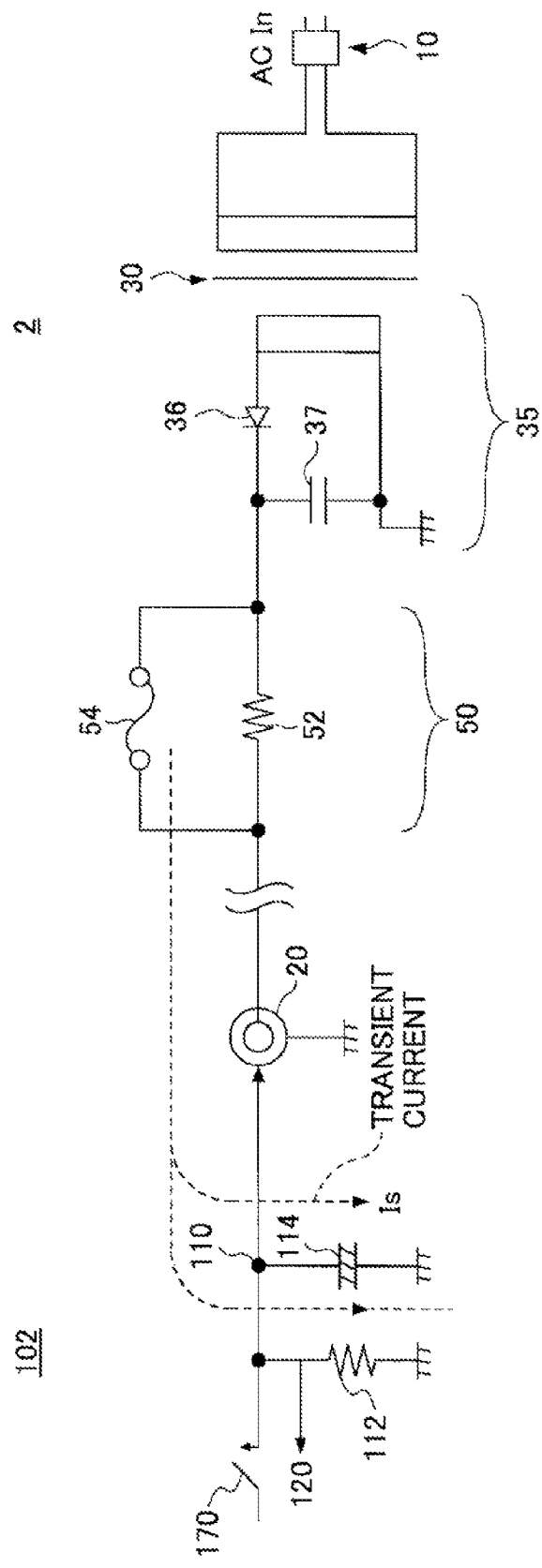
FIG. 13 is a diagram illustrating a partial configuration in a state in which an AC adapter is connected to an electronic apparatus in a second embodiment.

FIG. 13 is a diagram illustrating a partial configuration in a state in which the AC adapter 2 is connected to the electronic apparatus 102 in the second embodiment. As illustrated in FIG. 13, the AC adapter 2 includes the contact 10 as the input terminal, and the contact 20 as the output terminal, the transformer 30, the rectification-smoothing circuit 35, and a voltage adjustment circuit 50. Components other than the voltage adjustment circuit 50 are the same as those in the first embodiment, and the explanation thereof will be omitted.

In the second embodiment, the voltage adjustment circuit 50 includes a resistor 52, and a Positive Thermal Constant (PTC) 54 as an overcurrent protecting fuse. The PTC 54 may be a device which has a positive temperature coefficient indicating that a resistance value increases depending on a temperature increase.

Moreover, the electronic apparatus 102 in the second embodiment includes a capacitor 114 parallel to a pull-down resistor 112, in addition to components which the electronic apparatus 101 in the first embodiment includes.

Figure 14:
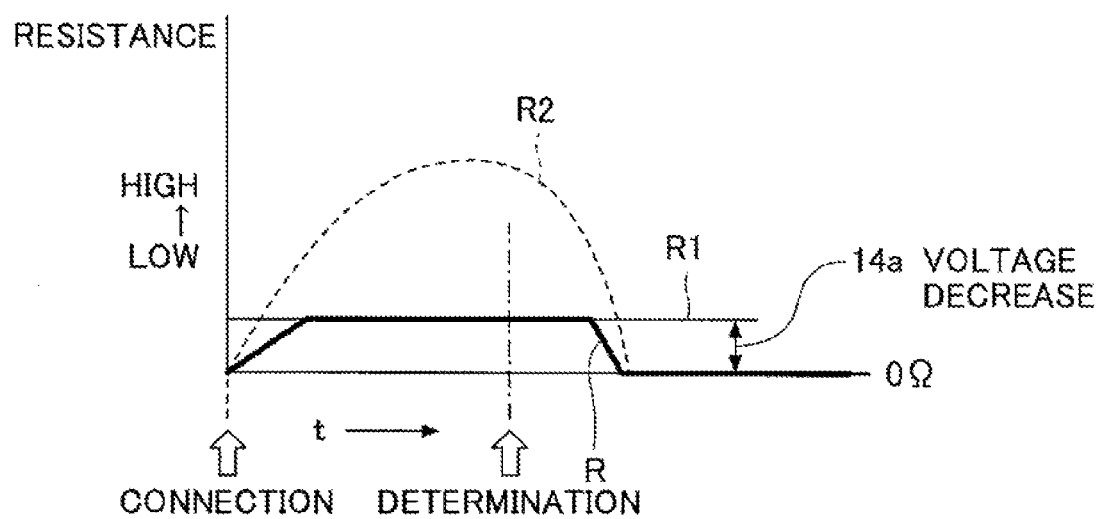
FIG. 14 is a diagram illustrating changes of resistance values of a voltage adjustment circuit from timing of connecting the AC adapter to the electronic apparatus.

FIG. 14 is a diagram illustrating changes of resistance values of the voltage adjustment circuit 50 from timing of connecting the AC adapter 2 to the electronic apparatus 102 in the second embodiment. In FIG. 14, a resistance value R1 of the resistor 52, a resistance value R2 of the PTC 54, and a combined resistance value R of combining the resistance values R1 and R2 are illustrated. The resistance value R1 is indicated by a thin solid line, the resistance value R2 is indicated by a dashed line, and the combined resistance value R is indicated by a heavy line. A voltage decrease 14a from the resistance value R1 to the combined resistance value R being approximately 0 [Ω] is illustrated in FIG. 14.

When the AC adapter 2 is connected to the electronic apparatus 102 in a state in which AC 100 [V] has been supplied to the AC adapter 2, a sharp transient current illustrated by Is in FIG. 13 flows toward the capacitor 114. Due to the transient current Is, the PTC 54 is heated, and the resistance value R2 is increased.

When the resistance value R2 is sufficiently increased, the combined resistance value R becomes approximately the same as the resistance value R1, and current almost does not flow to the PTC 54. Moreover, when a charge of the capacitor 114 ends, the transient current Is does not flow. As a result, temperature of the PTC 54 decreases, and the resistance value R2 becomes nearly 0 [Ω].

When the resistance value R2 is near 0 [Ω], the combined resistance value R is near 0 [Ω]. However, in this steady state, the transient current Is, which is a sharp current immediately after the AC adapter 2 is connected to the electronic apparatus 102, does not flow. The resistance value R2 is retained to be sufficiently lower than the resistance value R1, and a regular power supply is continued.

In the second embodiment, the AC adapter 2 temporarily raises a resistance value by using heat of the PTC 54 due to the transient current Is generated immediately after the AC adapter 2 is connected to the electronic apparatus 102. Accordingly, a voltage of the contact 20 is decreased by a predetermined voltage Vh from a regular supply voltage Vn (which may be 19 [V]) by a temporary increase of the resistance value. The predetermined voltage Vh is almost determined based on the resistance value R1 of the resistor 52.

Accordingly, by properly selecting the resistance value R1 of the resistor 52, it is possible to realize a predetermined voltage Vh which is desired.

In FIG. 14, timing represented by "DETERMINATION" is set beforehand in the electronic apparatus 102 to be included in a term in which the combined resistance value R becomes the resistance value R1, based on an experiment or the like.

At the electronic apparatus 102, contents of {Configuration}, {Specification Determination of AC Adapter}, {State Control}, {Screen Display Process}, {Screen Display Process}, and the like related to components other than the capacitor 114 are the same as those in the first embodiment. In the second embodiment, similar to the first embodiment, based on the specification of the AC adapter 2, the operation state is determined as one of three states: (1) only charging the battery 130, (2) only conducting an actual operation, and (3) charging the battery 130 and conducting the actual operation.

According to the AC adapter 2 in the second embodiment described above, the predetermined voltage Vh is set based on the specification of the AC adapter 2. Thus, it is possible to report the specification of the AC adapter 2 to the electronic apparatus 102 being the main device. Moreover, since the number of the output terminals is not increased, it is possible to suppress the increase of the cost and the size of the electronic apparatus 102.

Moreover, according to the electronic apparatus 102 in the second embodiment, it is possible to conduct the proper state control based on the specification of the AC adapter 2. Therefore, it is possible to prevent problems in which the suppliable power of the AC adapter 1 becomes insufficient, the operation of the electronic apparatus 101 stops, and the battery 130 is not sufficiently charged.

Furthermore, an effect in the second embodiment is the same as the effect described with reference to FIG. 12 in the first embodiment. Thus, it is possible to improve the compatibility of the AC adapter 2.

In the second embodiment, the AC adapter 2 and the electronic apparatus 102 correspond to an example of the "electronic apparatus unit" in claims.

The present invention may be used in production industries of an electronic apparatus typified by an electronic apparatus and an AC adapter being a peripheral device thereof.

Accordingly, it is possible to provide the AC adapter in which the compatibility is improved and the electronic apparatus unit using the AC adapter.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An AC adapter comprising:
   a voltage adjusting circuit configured to lower an initial supply voltage of direct current, which is converted from alternating current input to an input terminal, by a predetermined voltage from a regular supply voltage in a term after the AC adapter is connected to an electronic apparatus until a predetermined time lapses; and
   an output terminal configured to supply the initial supply voltage of the direct current in the term and to supply the regular supply voltage of the direct current after the term, to the electronic apparatus, the initial supply voltage and the regular supply voltage received from the voltage adjusting circuit.

2. The AC adapter as claimed in claim 1, wherein the predetermined voltage indicates a specification of the AC adapter.

3. The AC adapter as claimed in claim 1, wherein the voltage adjusting circuit is formed by a time-limit operation circuit which increases or decreases a resistance voltage by switching a state of a semiconductor switch depending on a charge voltage change of a capacitor.

4. The AC adapter as claimed in claim 1, wherein the voltage adjusting circuit includes a circuit in which an overcurrent protecting fuse and a resistor are connected in parallel to the output terminal.

5. An electronic apparatus unit comprising:
   an AC adapter; and
   an electronic apparatus,
   wherein the AC adapter includes:
      a voltage adjusting circuit configured to lower an initial supply voltage of direct current, which is converted from alternating current input to an input terminal, by a predetermined voltage from a regular supply voltage in a term after the AC adapter is connected to the electronic apparatus until a predetermined time lapses; and
      an output terminal configured to supply the initial supply voltage of the direct current in the term and to supply the regular supply voltage of the direct current after the term, to the electronic apparatus, the initial supply voltage and the regular supply voltage received from the voltage adjusting circuit,
   the electronic apparatus includes:
      a connector configured to connect to the output terminal of the AC adapter which supplies the regular supply voltage of direct current; and
      a control part configured to determine a specification of the AC adapter based on a decrease amount of the initial supply voltage of the output terminal of the AC adapter from the regular supply voltage in the term after the output terminal of the AC adapter is connected.

6. The electronic apparatus unit as claimed in claim 5, wherein the control part selects one of a state of charging an internal battery of the electronic apparatus, a state of performing an actual operation of the electronic apparatus, and a state of charging the internal battery and performing the actual operation of the electronic apparatus based on the specification of the AC adapter determined by the control part, to be a state of the electronic apparatus.

7. An electronic apparatus comprising:
   a connector configured to connect to an output terminal of an AC adapter which supplies a regular supply voltage of direct current; and
   a control part configured to determine a specification of the AC adapter based on a decrease amount of an initial supply voltage of the output terminal of the AC adapter from the regular supply voltage in a term after the output terminal of the AC adapter is connected.

8. The electronic apparatus as claimed in claim 7, wherein the control part selects one of a state of charging an internal battery of the electronic apparatus, a state of performing an actual operation of the electronic apparatus, and a state of charging the internal battery and performing the actual operation of the electronic apparatus based on the specification of the AC adapter determined by the control part, to be a state of the electronic apparatus.

* * * * *